United States Patent
Höfer et al.

[11] 3,883,047
[45] May 13, 1975

[54] INJECTION UNIT FOR AN INJECTION MOLDING MACHINE

[75] Inventors: Heinz Höfer, Schoneberg; Sushil Chaudhry, Heuchling near Lauf, both of Germany

[73] Assignee: DEMAG Kunststofftechnik Gesellschaft mit beschrankter Haftung, Nurnberg, Germany

[22] Filed: Mar. 15, 1973

[21] Appl. No.: 341,483

[30] Foreign Application Priority Data
Mar. 16, 1972 Germany............................. 2212752

[52] U.S. Cl. .............................................. 222/413
[51] Int. Cl ............................................... B29f 1/06
[58] Field of Search ........... 425/247, 209, 376, 244, 425/245, 243; 222/413

[56] References Cited
UNITED STATES PATENTS

| | | | |
|---|---|---|---|
| 3,337,921 | 8/1967 | Kaiser et al..................... | 222/413 X |
| 3,577,597 | 9/1968 | Draudt et al..................... | 425/245 X |
| 3,594,869 | 2/1969 | Sher................................ | 425/243 X |
| 3,729,280 | 4/1973 | Hehl................................ | 272/413 X |

Primary Examiner—Robert B. Reeves
Assistant Examiner—David A. Scherbel
Attorney, Agent, or Firm—Walter Becker

[57] ABSTRACT

An injection unit for injection molding machines with a plasticizing cylinder and a rotatable worm axially displaceable therein, and with an injection cylinder and a hollow piston in the latter for axially displacing the worm, while the injection cylinder is arranged between the drive motor for the worm and the plasticizing cylinder and together therewith forms a carriage which is axially displaceable on guiding spars. The hollow piston of the injection cylinder and the housing of the drive motor are connected to each other and provided with a torque support, and the drive shaft of the worm is rotatable but not axially displaceable in the hollow piston. The hollow piston has that side thereof which faces toward the plasticizing cylinder provided with a piston rod-shaped extension on which the torque support is provided which axially displaceably rests on connecting elements interconnecting the plasticizing cylinder and the injection cylinder.

3 Claims, 4 Drawing Figures

INJECTION UNIT FOR AN INJECTION MOLDING MACHINE

The present invention relates to an injection unit for an injection molding machine which unit comprises a plasticizing cylinder and a worm which is rotatably and axially displaceably arranged therein. The injection unit according to the present invention furthermore comprises an injection cylinder and a hollow piston reciprocable therein for an axial displacement of the worm, and is furthermore equipped with a drive motor for rotating the worm while the injection cylinder is located between the drive motor and the plasticizing cylinder and is combined with the latter to form a carriage. The carriage is axially displaceably mounted on guiding spars of the machine. Furthermore, the hollow piston of the injection cylinder and the housing of the drive motor are connected to each other and are equipped with a torque support while the input shaft of the worm is rotatable in the hollow piston but is not axially displaceable.

With this frequently preferred construction of the injection unit, the plasticizing cylinder and the injection cylinder are combined with each other to form a carriage which is mounted on at least two guiding spars of the machine and in this way is secured against rotation about its longitudinal axis. In order to move the plasticizing cylinder with its injection nozzle to the injection mold and in order to lift the injection nozzle off the injection mold, the entire injection unit may be axially displaced on the guiding spars. The hollow piston of the injection cylinder has that side thereof which faces toward the drive motor provided with a piston rod-shaped extension which protrudes from the injection cylinder and on which is connected the housing for the drive motor. This construction which is made possible by the arrangement of the injection cylinder between the plasticizing cylinder and the drive motor has the advantage that the drive motor is easily accessible and can be quickly exchanged in contrast to other heretofore known constructions in which the drive motor is located between the plasticizing cylinder and the injection cylinder. The worm of the plasticizing cylinder and the drive shaft of the worm which is rotatable but axially nondisplaceable and extends through the hollow piston of the injection cylinder, as well as the drive shaft and the rotor of the drive motor are combined to a unit which is rotatable within the injection unit. This is for purposes of plasticizing the synthetic material in the plasticizing cylinder driven by the drive motor. The unit is furthermore axially displaceable by means of the hollow piston of the injection cylinder for ejecting (ausspritzen) the plasticized synthetic material within the injection unit.

The hollow piston of the injection cylinder and the housing of the drive motor combined therewith to a unit have to absorb the reaction forces of the drive motor and therefore have to be secured by a torque support against a rotation about their longitudinal axes, i.e., against a rotation of the hollow piston in the injection cylinder. This torque support may be formed, for instance, by a lever or the like which, on the one hand, is connected to the hollow piston or the motor housing and, on the other hand, rests against the carriage of the injection unit. With heretofore known machines, the torque support is supported in such a way that either the plasticizing cylinder or the injection cylinder is provided with one or two supporting spars on which the torque support rests and may axially slide with its guiding means when the hollow piston is axially displaced, or in a kinematically reversed manner, the torque support is provided with one or two support bars which are axially displaceably arranged in guiding means on the plasticizing cylinder or on the injection cylinder. This construction has the great disadvantage that for purposes of supporting the torque support, special supporting spars or supporting bars are necessary which must be particularly strong in order to absorb the torque, particularly when they are supported at one end only or are inn the form of cantilevers. These supporting spars or bars not only require a considerable amount of additional material, assembly and manufacturing costs, but also impede the accessibility and exchangeability of other structural elements.

When employing one supporting spar or one supporting bar only, the above mentioned disadvantages can only partially be avoided, while on the other hand the drawback is encountered that jamming may occur as a result of distortions, tilting, or the like. The elimination of these drawbacks frequently causes the adoption of the above mentioned construction with an arrangement of the drive motor between the plasticizing cylinder and the injection cylinder. While with this construction the motor housing can easily non-rotatably be arranged on the carriage, the drive motor is, however, not yet easily accessible and exchangeable, and the drive shaft of the worm must be in an axially displaceable manner passed through the drive motor so that a complicated and expensive connection of the rotor of the motor with the drive shaft by teeth sliding in each other is necessary and also a special noncommerical construction of the drive motor.

It is, therefore, an object of the present invention with an injection unit for injecting molding machines of the above described general character to overcome the above mentioned drawbacks by an improved carriage construction and an improved support for the torque support.

These and other objects and advantages of the invention will appear more clearly from the following specification in connection with the accompanying drawings, in which.

The injection unit according to the present invention is characterized primarily in that the hollow piston on that side thereof which faces toward the plasticizing cylinder is provided with a piston rod-shaped extension which protrudes from the injection cylinder and is equipped with the torque support which latter axially displaceably rests on the spars which form the connecting elements connecting the plasticizing cylinder and the injection cylinder with each other so as to form a carriage.

The connecting elements which for forming the carriage connect the plasticizing cylinder and the injection cylinder with each other must be so strong that they are able to absorb the considerable pulling forces which occur in the form of reaction forces when the injection cylinder generates the customarily high injection pressures for ejecting the material from the plasticizing cylinder into the injection mold and when, after filling the mold, the post-pressure is generated for compensating for shrinkage.

The invention is based on the finding that the anyhow necessary and present connecting elements for absorbing the injection pressure must be so dimensioned that they will also suffice for absorbing the torque of the device motor. The invention is furthermore based on the additional finding that no additional or greater dimensioning of the connecting elements is necessary if in addition to the function of absorbing the injection pressure, they would also be given the function to absorb the torque, because a superimposing of injection pressure and torque does not occur inasmuch as the high torque occurs only when plasticizing synthetic material by the rotation of the worm and the injection pressure occurs only when injecting the plasticized synthetic material by the axial advance of the worm. Starting with these findings, the connecting elements are designed as pull spars on which the torque support can rest in an axially displaceable manner so that in a surprisingly simple manner the same connecting elements, which combine the plasticizing cylinder and the injection cylinder to form the carriage and absorb the injection pressure, at the same time also absorb the torque and can serve as support for the torque support so that for this purpose no additional structural elements are necessary.

According to a further development of the invention, the connection of the plasticizing cylinder and the injection cylinder by the pull spars can in a particularly simple manner be effected by providing the plasticizing cylinder and the injection cylinder with housing shields which face each other and in which the ends of the spars are connected.

Figure 1:
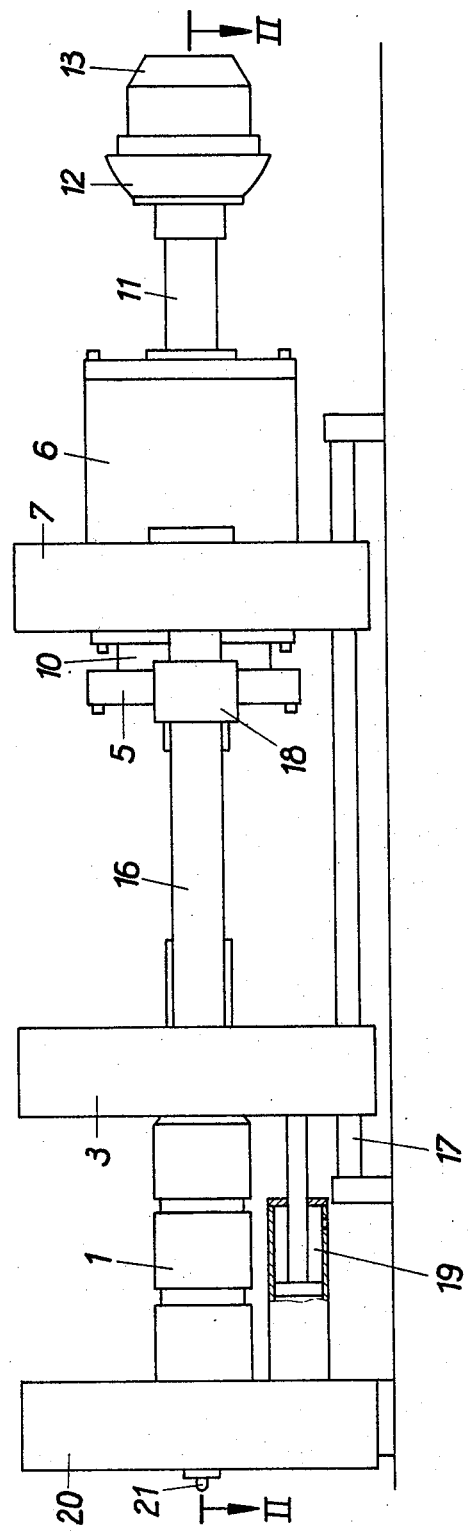
FIG. 1 is a side view of an injection unit according to the invention.
Figure 2:
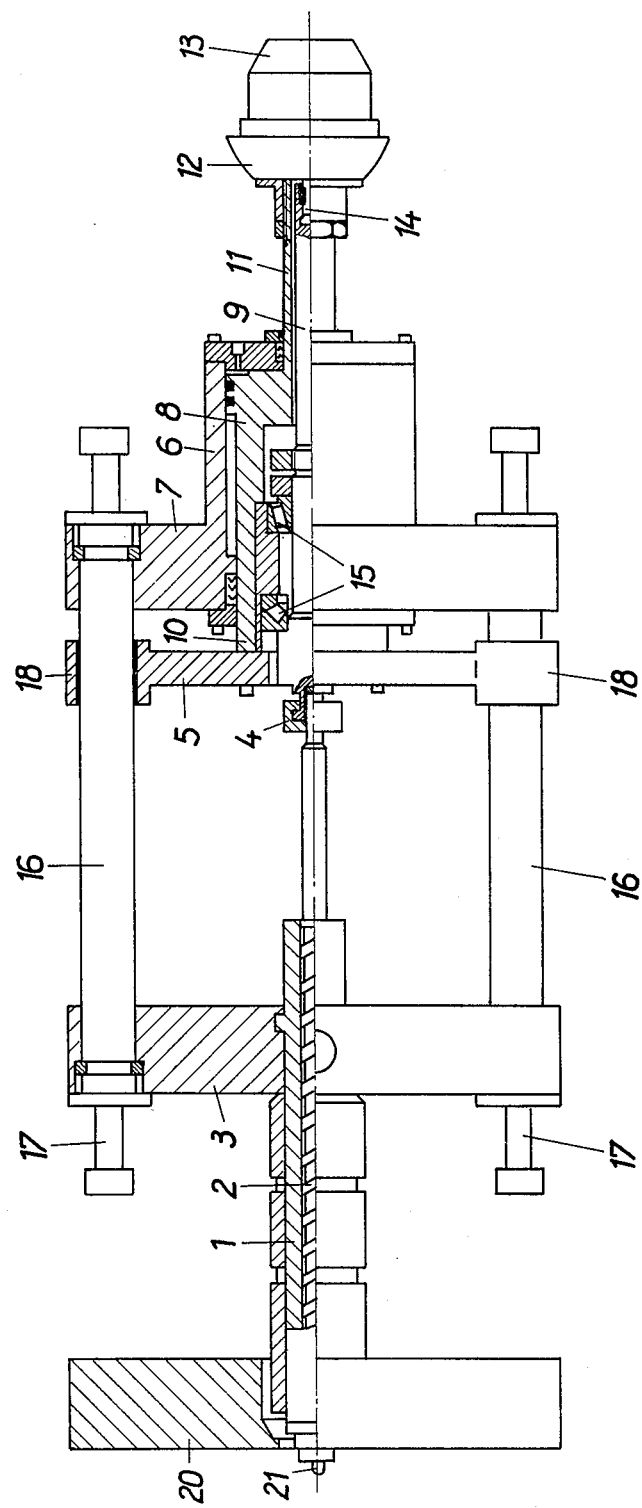
FIG. 2 shows the injection unit of FIG. 1 partially in top view and partially in longitudinal section along the line II — II of FIG. 1.

Referring now to the drawings in detail, the injection unit shown in FIGS. 1 and 2 comprises a plasticizing cylinder 1 with a worm 2 which is rotatable and axially displaceable in the cylinder 1. The injection unit furthermore comprises an electric drive motor 12 with a motor housing 13 and a motor shaft 14 and also comprises a hydraulic injection cylinder 6 located between the plasticizing cylinder 1 and the drive motor 12. The injection cylinder 6 has axially displaceably arranged therein a hollow piston 8. For facilitating the assembly, the two-sectional worm 2 has a detachable drive shaft 9 which at one of its ends is connected to the worm 2 by a coupling 4 and has its other end connected to the motor shaft 14. The drive shaft 9 is by means of a bearing 15 rotatably journalled in the hollow piston 8 but is not axially displaceable. The hollow piston 8 has that side thereof which faces toward the plasticizing cylinder 1 provided with a piston rod-shaped extension 10 which protrudes from the injection cylinder 6. This extension 10 has connected thereto a torque support 5. That side of the hollow piston 8 which faces toward the drive motor 12 is provided with a piston-rod-shaped extension 11 which protrudes from the injection cylinder 6. The extension 11 has flanged thereto the housing 13 of the drive motor 12. The plasticizing cylinder 1 is provided with a housing shield 3, and the injection cylinder 6 is provided with a housing shield 7. In the housing shields 3 and 7 which face each other there are connected the ends of pull spars 16 which in the form of connecting elements connect the plasticizing cylinder 1 and the injection cylinder 6 firmly with each other so as to form a carriage which with the housing shields 3, 7 is axially displaceably mounted on guiding spars 17 of the machine. The torque support 5 rests by means of guiding members 18 axially displaceably on pull spars 16 of the carriage. Of the mold closing unit pertaining to the injection molding machine, only one of the two mold clamping plates 20 is shown onto which a non-illustrated mold section of an injection mold is clamped. The mold clamping plate 20 is provided with an opening into which the plasticizing cylinder 1 may be moved so that its injection nozzle 21 engages the dead head opening of the injection mold.

For moving the injection nozzle 21 onto the injection mold and for lifting off the injection nozzle 21 from the injection mold, the entire injection unit is by means of a hydraulic feeding cylinder 19 displaced axially while the carriage 1, 3, 6, 7, 16 slides on the guiding spars 17 of the machine. During the plasticizing operation, the rotational movement of the worm 2 is brought about in the plasticizing cylinder 1 by means of the drive shaft 9 and the motor shaft 14. The torque is absorbed by the pull spars 16 of the carriage on which the torque support 5 rests which latter secures the hollow piston 8 and the housing 13 connected thereto and pertaining to the drive motor 12 against rotation. During the injection operation, the worm 2 moves axially in the plasticizing cylinder 1 by means of the hollow piston 8 of the injection cylinder 6. The hollow piston 8 takes along the drive shaft 9 of worm 2 and also the drive motor 12 connected thereto and furthermore takes along the torque support 5 connected to the drive motor 12. The torque support 5 slides on the pull spars 16 of the carriage which connect the plasticizing cylinder 1 and the injection cylinder 6 firmly with each other and thereby absorb the injection pressure.

In the embodiment illustrated in the drawings, two pull spars 16 are employed. If desired, also more than two pull spars may be employed in conformity with the size of the machine. These pull spars may be designed as bars or as tubes, while the torque support 5 may, if desired, rest upon more than two spars.

Figure 3:
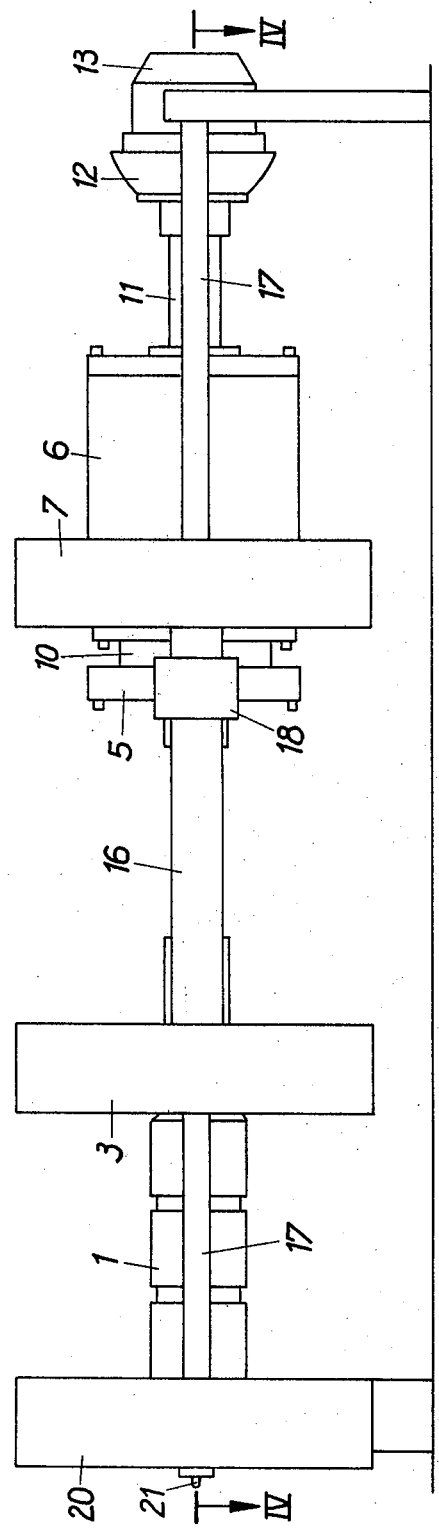
FIG. 3 is a side view of another embodiment of an injection unit according to the invention.
Figure 4:
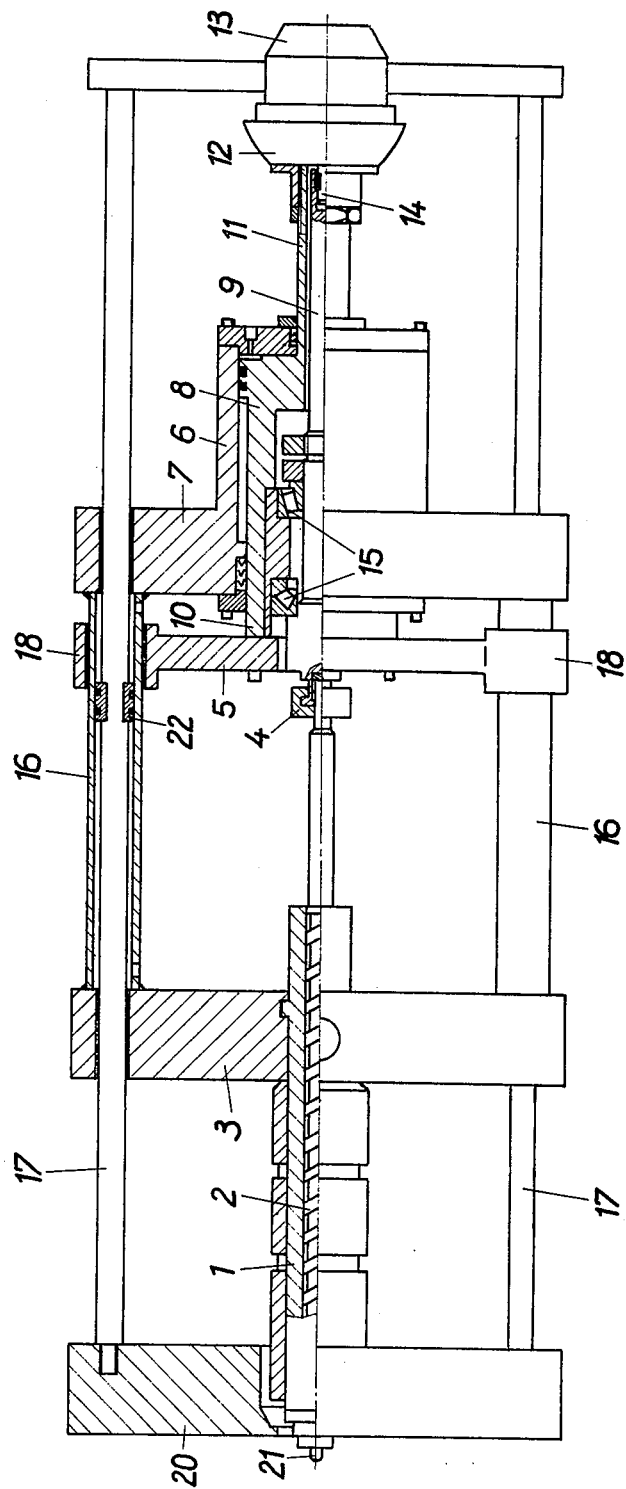
FIG. 4 illustrates the injection unit of FIG. 3 partially in top view and partially in longitudinal section along the line VI — VI of FIG. 3.

The embodiment of FIGS. 3 and 4 differs from that of FIGS. 1 and 2 in that the feeding cylinder 19 has been omitted. Instead of this cylinder 19, the pull spars 16 of the carriage and the guiding spars 17 of the machine are so arranged and designed that together they form two feeding cylinders which serve for an axial displacement of the entire injection unit. To this end, the carriage 1, 3, 6, 7, 16 has tubular pull spars 16 by means of which the carriage is axially displaceably mounted on the guiding spars 17 of the machine. The pull spars 16 form hydraulic cylinders which extend around the guiding spars, and the guiding spars 17 are formed by piston rods and are provided with a piston 22 mounted thereon.

It is, of course, to be understood that the present invention is, by no means, limited to the specific showing in the drawings, but also comprises any modifications within the scope of the appended claims.

What we claim is:

1. An injection unit for injection molding machines, which includes in combination: a plasticizing cylinder, a worm rotatably and axially displaceably arranged in said plasticizing cylinder, an injection cylinder arranged in substantially axial alignment with said plasticizing cylinder, fluid operable hollow piston means reciprocably arranged in said injection cylinder and having one side thereof facing said plasticizing cylinder and provided with a cylindrical extension extending through said injection cylinder in the direction toward said plasticizing cylinder, operatively connected to said worm for axially moving the same while permitting only rotation of said worm relative to said piston means, motor means comprising housing means connected to said piston means, said motor means being drivingly connected to said worm for rotating said worm, said injection cylinder being located coaxially between said motor means and said plasticizing cylinder, connecting spar means interconnecting said injection cylinder and said plasticizing cylinder so as to form a carriage therewith, guiding spar means axially displaceably supporting said carriage, and torque support means arranged on said extension outside said injection cylinder, said torque support means being axially displaceably supported by said connecting spar means, so as to prevent rotation of said hollow piston means and said motor housing means.

2. An injection unit in combination according to claim 1, which includes shield means respectively arranged on said plasticizing and injection cylinders and facing each other while having the respective adjacent ends of said connecting spar means connected thereto.

3. An injection unit in combination according to claim 1, in which said connecting spar means form cylinders surrounding a section of said guiding spar means, said last mentioned section being provided with piston means forming with said section and the respective cylinder surrounding same as a fluid pressure actuator for axially moving the injection unit.

* * * * *